July 18, 1961  A. G. LOOFBOURROW ET AL  2,992,852
SWIVEL SEAT ACTUATING MECHANISM FOR AN AUTOMOBILE
Filed Sept. 4, 1959  5 Sheets-Sheet 1
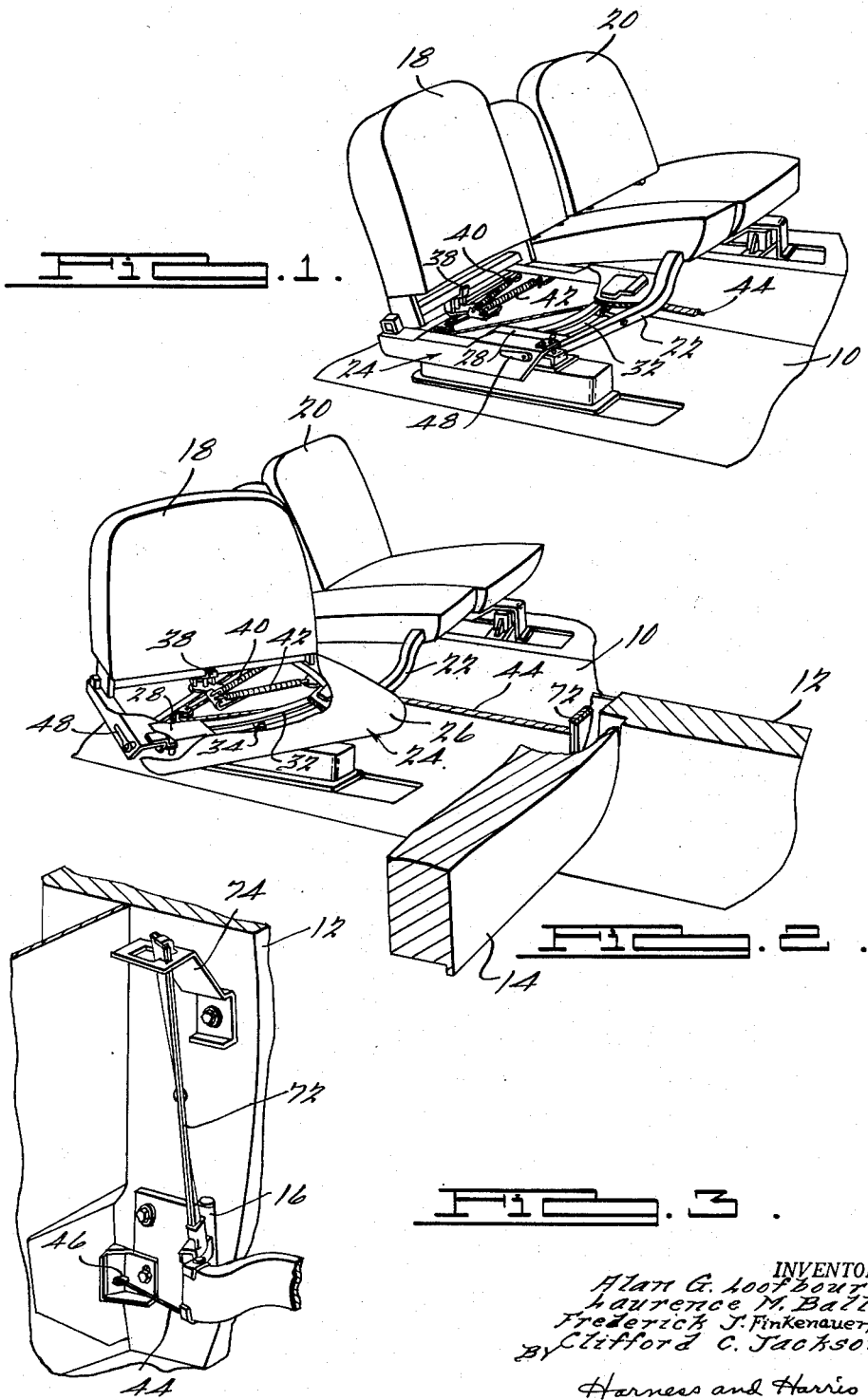
INVENTORS.
Alan G. Loofbourrow,
Laurence M. Ball,
Frederick J. Finkenauer, Jr.
Clifford C. Jackson.
By Harness and Harris
ATTORNEYS.

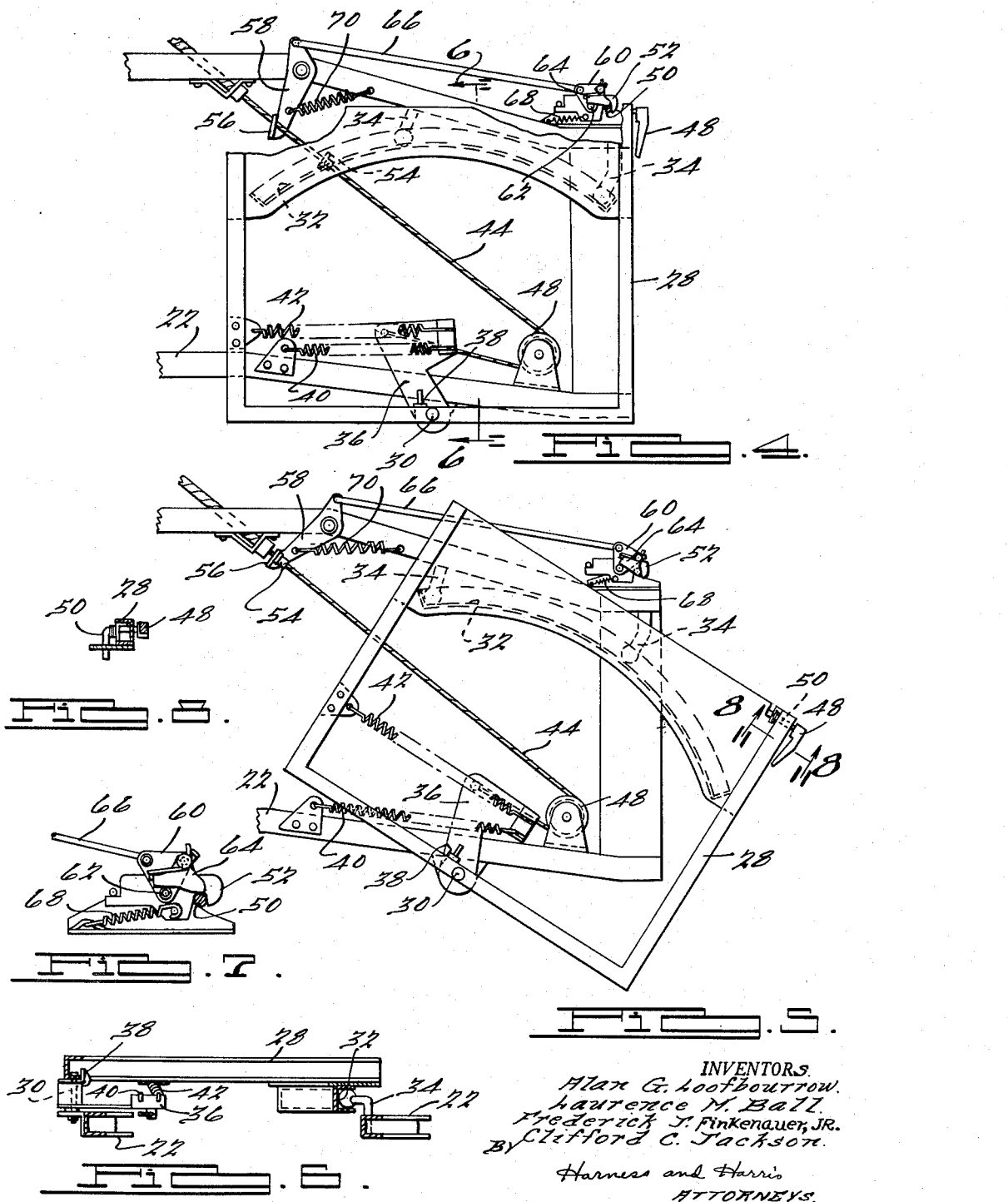

July 18, 1961 A. G. LOOFBOURROW ET AL 2,992,852
SWIVEL SEAT ACTUATING MECHANISM FOR AN AUTOMOBILE
Filed Sept. 4, 1959 5 Sheets-Sheet 3

INVENTORS.
Alan G. Loofbourrow.
Laurence M. Ball.
Frederick J. Finkenauer, Jr.
BY Clifford C. Jackson.
Harness and Harris
ATTORNEYS.

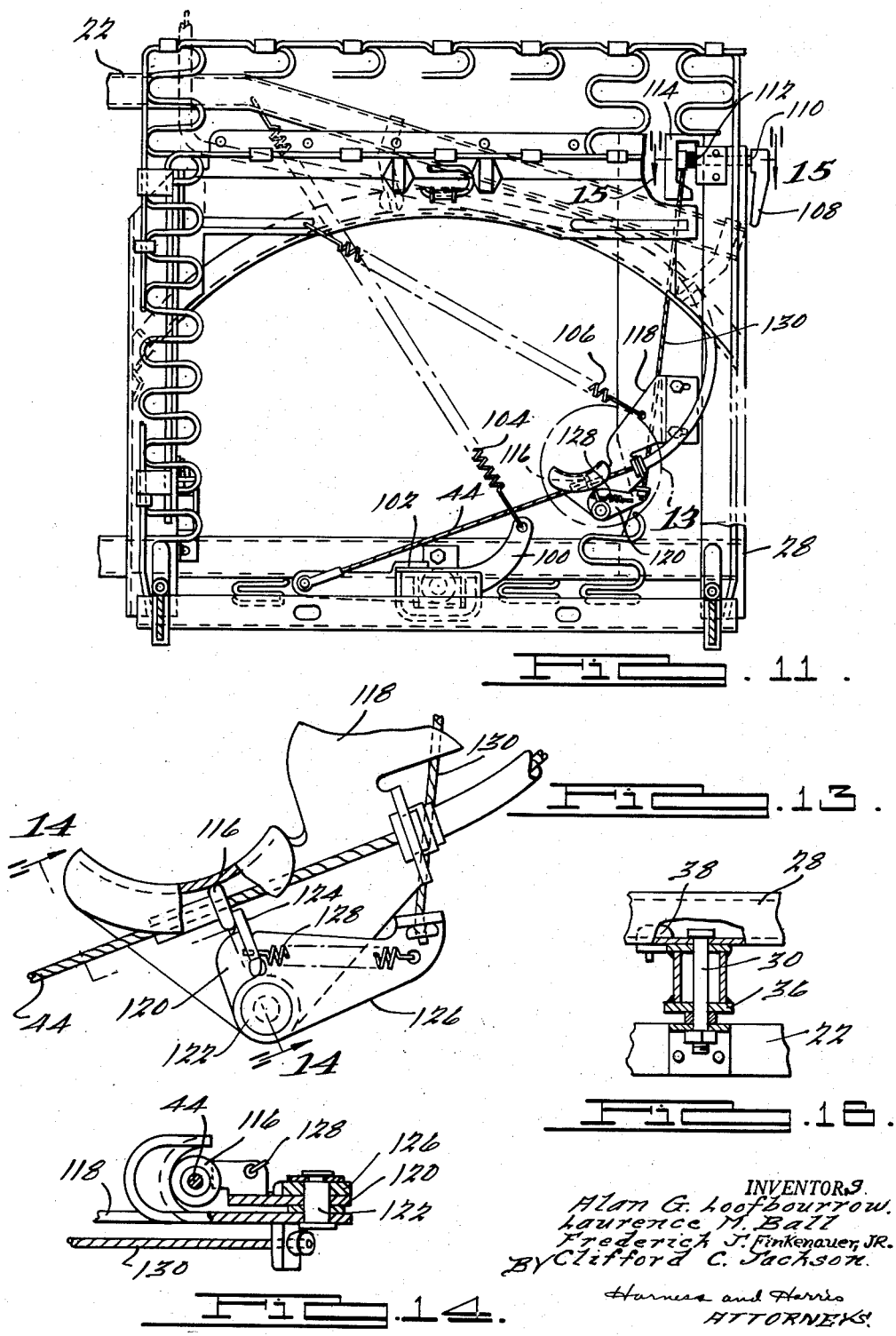

July 18, 1961 A. G. LOOFBOURROW ET AL 2,992,852
SWIVEL SEAT ACTUATING MECHANISM FOR AN AUTOMOBILE
Filed Sept. 4, 1959 5 Sheets-Sheet 5
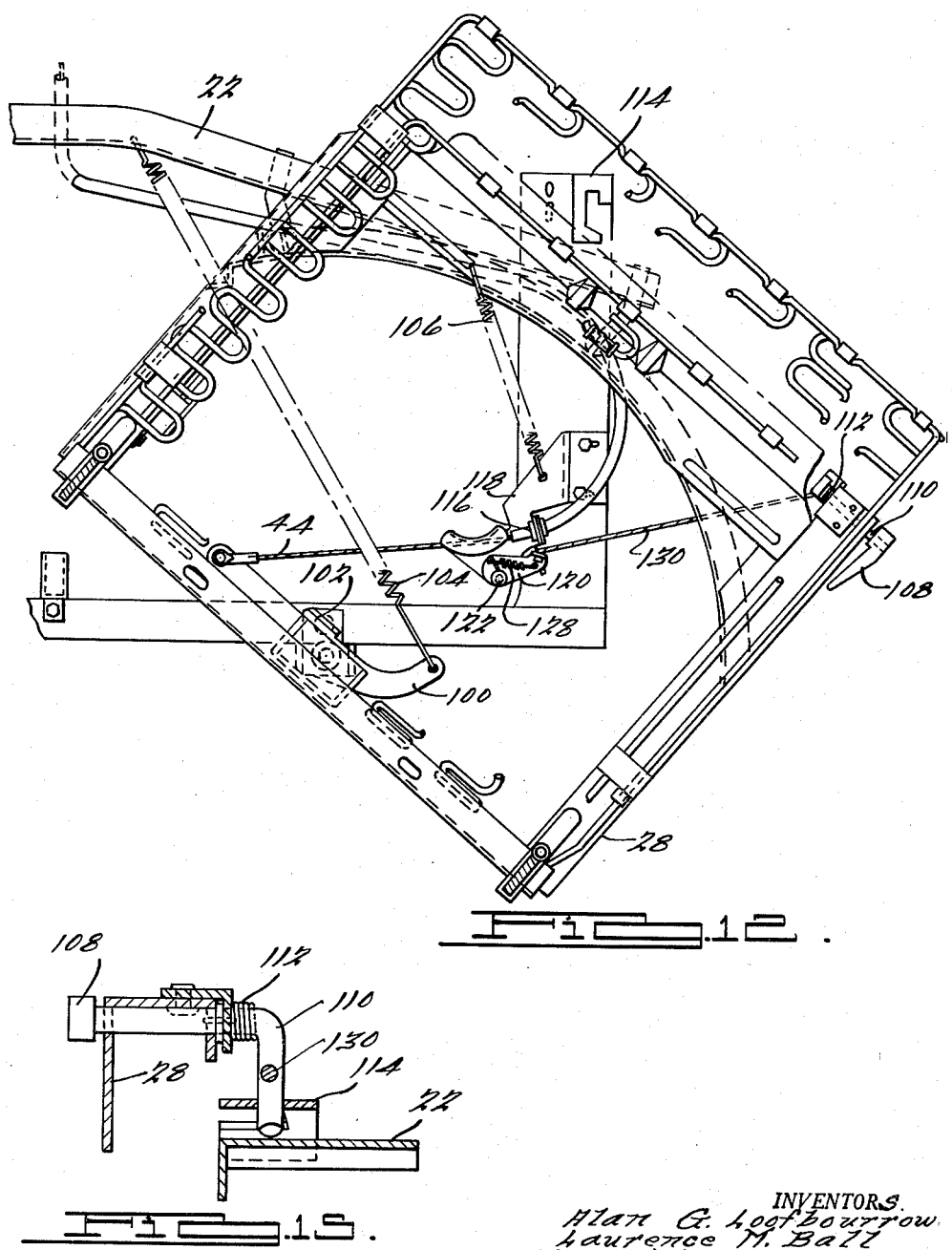
INVENTORS.
Alan G. Loofbourrow
Laurence M. Ball
Frederick J. Finkenauer, JR.
By Clifford C. Jackson.
Harness and Harris
ATTORNEYS.

United States Patent Office 2,992,852
Patented July 18, 1961

2,992,852
SWIVEL SEAT ACTUATING MECHANISM FOR AN AUTOMOBILE
Alan G. Loofbourrow, Laurence M. Ball, Frederick J. Finkenauer, Jr., and Clifford C. Jackson, Birmingham, Mich., assignors to Chrysler Corporation, Highland Park, Mich., a corporation of Delaware
Filed Sept. 4, 1959, Ser. No. 838,272
8 Claims. (Cl. 296—68)

This invention relates to mechanism adapted to induce movement of an automobile seat in response to opening and closing movements of an automobile door to facilitate entrance and egress from the automobile.

Some automobiles are currently offered commercially with seats mounted for pivotal or swivel movement and these seats have a driving position in which the seat faces towards the windshield of the automobile and an entrance position in which the seat faces toward the door opening. In addition, such seats are generally provided with a latch mechanism operable to latch the seat in its forward facing driving position. However, manual manipulation of this latch and manual rotation of the seat are characteristics of the presently offered seats.

It is a principal object of this invention to provide means to automatically unlatch the seat and pivot it to its entry position upon opening of the door and to provide mechanism operable to automatically return the seat to its driving position upon closing of the door. The seat thus swings out when the door is opened and swings back out of the way when the door is closed.

It is a further object of the invention to provide mechanism such that the forces operating to pivot the seat in either direction do not exceed predetermined desirable limits regardless of an accidental application of large force to the opening and or closing movement of the door. The seat is pivoted in both directions by spring means and intermediate mechanism is provided for actuation directly by the door so that movement of the seat is induced by the springs and is not directly induced by linkage or cables connected to the door. This is important for injury could result if a child or other person inadvertently had his hand or the like in a place that would be pinched by movement of the seat. It would be undesirable to have the amount of force applied to the door transmitted directly to the seat and to the infant's hand.

It is also an object of the invention to provide seat operaing mechanism coupled to the door that necessitates a minimum of alteration of conventional automobile body structure so that automobiles may be built with the mechanism incorporated or not incorporated in the automobile with a minimum of change or modifications required.

It is a further object of the invention to provide a flexible cable that is tensioned upon opening of the door to stretch a pair of springs associated with the seat and to provide mechanism so that one of these springs swivels the seat outward and as the door is closed the other spring serves to return the seat to its driving position.

It is an additional object of the invention to provide first mechanism for automatically unlatching the seat from its latched driving position as an incident to opening of the door and to provide additional mechanism that will overrule the first mechanism to prevent unlatching of the seat when it is occupied and the door is opened.

In the drawings:

FIG. 1 is a perspective view, partially broken away, of an automobile seat incorporating our invention;

FIG. 2 is a perspective view partially broken away showing one section of the seat positioned to accommodate entrance to the vehicle;

FIG. 3 is a perspective view of the automobile door hinge and associated mechanism;

FIG. 4 is a fragmentary plan view of an automobile seat structure incorporating our invention with the seat positioned in its driving position;

FIG. 5 is a view similar to FIG. 4 showing the seat in its entry position;

FIG. 6 is a section taken on the line 6—6 of FIG. 4;

FIG. 7 is a plan view of the latch mechanism of FIG. 4 showing it on a larger scale;

FIG. 8 is a section taken on the line 8—8 of FIG. 5;

FIG. 11 is a plan view of a seat structure showing a modified form of our invention with the seat illustrated in its driving position;

FIG. 12 is a plan view similar to FIG. 11 but illustrating the seat in its entry position;

FIG. 13 is a fragmentary plan view illustrating on an enlarged scale the mechanism designated by the circle 13 in FIG. 11;

FIG. 14 is a sectional view taken on the line 14—14 of FIG. 13;

FIG. 15 is a sectional view taken on the line 15—15 of FIG. 11; and

FIG. 16 is a section taken on the line 16—16 of FIG. 10.

Figure 9:
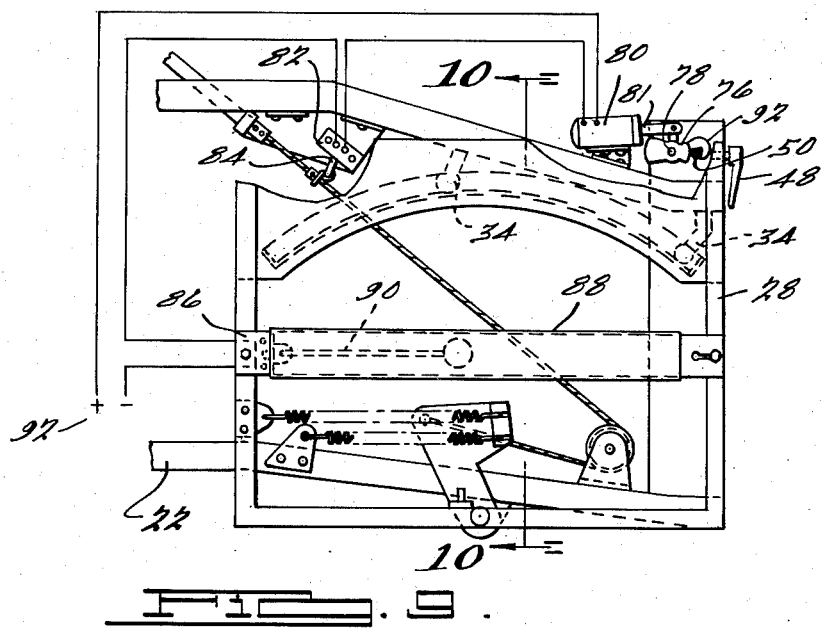
FIG. 9 is a plan view of a modified seat structure incorporating electrical latch controlling mechanism.

In FIGS. 1 and 2 a seat structure is illustrated as supported upon the floor 10 of an automobile. The automobile also includes a cowl structure 12 on which a conventional door 14 is hinged by means of a hinge 16.

The seat structure includes right and left seats 18 and 20 which are generally similar but of opposite hand. For the purpose of this description the seat structure 18 will be described. The seat structure includes a stationary seat support 22 and a movable seat structure 24 which includes a cushion 26 and a movable seat frame 28 to which the cushion is secured.

Referring to FIGS. 4 and 5 it will be seen that the seat frame 28 is pivotally mounted on the seat support 22 by means of a pin 30 and the seat frame 28 is adapted to be positioned as illustrated in FIG. 4 under normal driving conditions. The seat frame assumes the position illustrated in FIG. 5 when the door is opened for entry or exit from the vehicle. In order to provide stability to the movable seat frame it is provided with a track 32 which rides on a pair of round headed studs 34 carried by the stationary seat support 22.

The above described seat and seat support conforms to seats commercially available, but our invention contemplates the addition of parts now to be described to control the movement of the seat. A pivoted plate or member 36 is carried by pin 30 and it includes an abutment 38 formed thereon. A first spring 40 urges the pivoted plate or member 36 in a counterclockwise direction so that the abutment 38 imparts such counterclockwise movement to the seat frame 28. A second spring 42 is operatively connected to the pivoted plate or member 36 and to the seat frame 28. The spring 42 urges the seat frame 28 toward the entry position illustrated in FIG. 5.

Apparatus is provided so that an operative connection exists between the door 14 and the pivoted plate or member 36 to thereby influence the position of the member 36 by the position of the door 14. A cable 44 has one end thereof connected to that portion of the hinge 16 on which the door 14 is mounted. This may best be seen in FIG. 3. The cable 44 penetrates the cowl structure 12 of the automobile through an opening 46 and it is preferably concealed by the floor mats of the vehicle as it extends laterally and rearwardly of the floor 10 toward the seat 18. The cable 44 passes around a wheel 48 and is connected to the pivoted plate or member 36. It will thus be seen that when the door 14 is opened tension is applied to the cable 44 and the pivoted plate or member 36 is urged in a clockwise direction from its FIG. 4 to its FIG. 5 position. In the absence of anything restraining the seat frame 28 the spring 42 would cause the seat frame 28 to rotate in a clockwise direction and the abutment 38 on the pivoted plate or member 36 would limit the clockwise movement of the seat frame 28. Conversely, if the door was closed the cable 44 would assume a relaxed condition and the spring 40 would then return the pivoted plate or member 36 in a counterclockwise direction and by means of the abutment 38 this motion would be imparted to the seat frame 28 to cause it to assume its FIG. 4 position.

In pivoted seats of this type it is necessary to latch the seat in its driving position and thus the above described apparatus must be supplemented with means to unlatch the seat.

In order to selectively latch the seat frame 28 in its driving position a manually operable latch handle 48 is provided. The handle 48 is keyed to an L-shaped latch bolt 50 which is illustrated in FIG. 8 and is pivotally mounted in the seat frame 28 and adapted for reception in a keeper 52 carried by the seat support 22. Rotation of handle 48 can thus effect an unlatching of the seat at any time.

It is, however, desirable that when the door is opened that the seat unlatch automatically so that the additional manual movement of unlatching the seat will not be required. Referring to FIGS. 4 and 5 it will be seen that means is provided to accomplish this. An abutment 54 is carried by cable 44 and adapted to engage an abutment 56 on a pivoted lever 58 in response to a predetermined amount of movement of cable 44 imparted by opening of the door. A small plate 60 is pivotally mounted at 62 and carries a pawl 64 which is pivotally mounted thereon and spring urged to a position illustrated in FIG. 7. A link 66 connects the previously mentioned lever 58 and the small plate 60 so that rotation of lever 58 is transmitted through link 66 to impart clockwise rotation to the small plate 60 in FIG. 7 and by means of the pawl 64 the latch bolt 50 is forced out of the keeper 52. It will thus be seen that the seat is automatically unlatched when the door is opened a predetermined amount.

When the door is closed and the seat is returned to its driving position the latch reengages. This is accomplished when the latch bolt 50 strikes the keeper 52. It should be noted that the keeper 52 is pivotally mounted at 62 and only spring urged by a spring 68 to its FIG. 7 position. The keeper thus can temporarily pivot enough to accommodate penetration by the latch bolt 50 and the spring 68 restores the keeper to its FIG. 7 latched position.

In the event that someone manually returns seat 18 to its driving position while retaining the door in its opened position the seat will still latch. This is accomplished by the fact that the pawl 64 is pivotally mounted and spring urged to its FIG. 7 position. Thus even though the door being opened causes pawl 64 to be in its FIG. 5 position the latch bolt 50 will return to its place in the keeper 52 with the pawl 64 positioned inboard of the bolt 50. Subsequent closing of the door will withdraw abutment 54 on cable 44 from the proximity of lever 58 and a spring 70 which connects the lever 58 and seat support 22 will restore link 66 and plate 60 to the FIG. 7 seat latched positions. The rotation of plate 60 will merely cause pawl 64 to snap over latch bolt 50.

Since the opening of the door by means of cable 44 effects an elongation and tensioning of springs 40 and 42 means has been provided to assure that the effort required to open the door will remain within acceptable limits. In other words, it would be undesirable if the door opening effort was increased too much by the stretching of springs 40 and 42. To this end a torsion bar 72 has been provided. The torsion bar 72 is illustrated in FIG. 3 as secured to that portion of the hinge 16 which supports the door 14 and to a stationary bracket 74 carried by cowl structure 12. Closing movement of the door which is assisted by springs 40 and 42 twists torsion bar 72 to effectively wind it up and store energy in it. When the door is opened the torsion bar 72 releases the stored energy and assists in opening the door.

Figure 10:
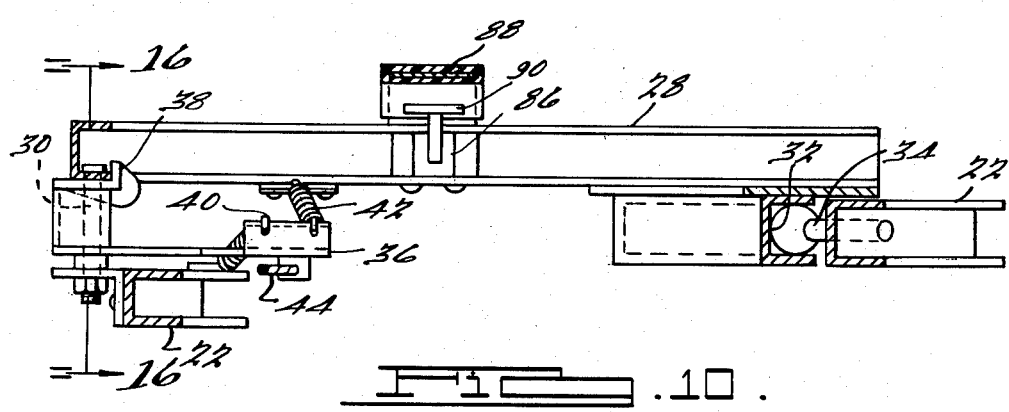
FIG. 10 is a sectional view taken on the line 10—10 of FIG. 9.

A modified form of latch operating device is illustrated in FIGS. 9 and 10. In this form of the device the seat and its support, the cable, pivoted plate or member and springs for actuating the plate or member and seat are identical to the FIGS. 1 through 8 form of the invention and the same numerals have been applied. However, the latch bolt 50 in FIG. 9 is restrained by a keeper 76 which is pivotally mounted at 78 on seat support 22. A solenoid 80 is connected to keeper 76 by linkage 81 and is adapted to rotate keeper 76 to free latch bolt 50 when the solenoid 80 is energized. A switch 82 is held in its open position by the abutment 84 on cable 44. When cable 44 is tensioned by the opening movement of the door the abutment 84 retreats away from the switch 82 and permits the switch to close. A second switch 86 is arranged in series with switch 82 and it is normally closed except that it is opened when a weight, such as that offered by a person sitting on the seat, is present. A strap 88 spans seat frame 28 and when depressed engages a pivoted arm 90 carried by switch 86. Depression of arm 90 effects an opening of switch 86. A suitable source of electric current is indicated at 92 and it is connected to solenoid 80 in series with switches 82 and 86 as illustrated in FIG. 9. It will thus be seen that opening of the door will effect a closing of switch 82 and the application of current to solenoid 80 through switch 82 and the normally closed switch 86 will effect an unlatching of the seat. However, if the seat is occupied the switch 86 will be opened and the circuit interrupted so that opening of the door will not swivel the seat.

In FIGS. 11 through 16 a modified form of seat structure is illustrated. A principal difference in this seat structure from the seat structure illustrated in FIGS. 1 through 8 involves a different spring arrangement for swiveling the seat and a different mechanical means for unlatching the seat. Referring to FIGS. 11 and 12 it will be seen that the stationary seat support 22 carries a seat frame 28 and a pivoted plate or member 100 which generally resembles the plate on member 36 in the earlier form. The member 100 is provided with an abutment 102 for engaging the seat frame 28 in a manner resembling the action of the abutment 38 of the earlier form. A spring 104 connects the pivoted member 100 with the seat support 22 in a manner similar to the previously described spring 40. A spring 106 connects seat frame 28 to the stationary seat support 22. Attention is invited to the fact that the corresponding spring 42 in the earlier form was conneced to the pivoted member 36 rather than to the stationary seat support 22.

A manually operable handle 108 is carried by an L-shaped latch bolt 110 which is urged by a spring 112 to a latching position where it is adapted to engage a stationary slotted keeper 114 best illustrated in FIG. 12.

The cable 44 carries an abutment 116 illustrated in FIG. 13 and the stationary seat support 22 carries a bracket 118 on which a lever 120 is pivoted at 122. The lever 120 has a cooperating abutment 124. Another lever 126 is similarly pivoted at 122 and is urged by a spring 128 into abutting relationship with abutment 124. A cable 130 connects lever 126 and latch bolt 110. It will thus be seen that as the door is opened and cable 44 is moved to the right in FIG. 13 its abutment 116 will engage abutment 124 and move the latter clockwise which in turn will pivot lever 126 in a clockwise direction to pull on cable 130 thereby disengaging latch bolt 110 from its keeper 114.

In the event that someone returns the seat to its driving position and returns the latch to latched condition prior to closing the door the levers 126 and 120 will return to the FIG. 13 position while abutment 116 is to the right of abutment 124 in FIG. 13. Subsequent closing of the door will move abutment 116 to the left and spring 128 will accommodate a temporary movement of lever 120 so that the abutment 116 can pass the abutment 124 and assume its FIG. 13 position.

It will thus be seen that in this form of the invention opening of the door will effect an unlatching of the seat and a movement of the seat from its FIG. 11 driving position to its FIG. 12 entry position and closing of the door will return the seat to its FIG. 11 driving position.

We claim:

1. In an automobile provided with a door mounted for movement between a closed position and an open position and a seat mounted for swiveling movement from a driving position to an entry position; apparatus responsive to door movement and operable to swivel said seat from its driving position to its entry position in response to movement of said door to its open position, said apparatus comprising a control member movable between a first station and a second station, motion transmitting structure interconnecting said door and said control member and operable to move said control member from its first station to its second station in response to movement of said door from its closed position to its open position, spring means urging said seat to swivel from its driving position to its entry position and abutment means carried by said control member and said seat and limiting the advance of said seat in the direction toward its entry position to positions determined by the position of said control member as induced by movement of said door.

2. In an automobile provided with a door mounted for movement between a closed position and an open position and return and a seat mounted for swiveling movement from a driving position to an entry position and return; apparatus operable to swivel said seat from its driving position to its entry position in response to movement of said door to its open position and operable to swivel said seat from its entry position to its driving position in response to movement of said door to its closed position, said apparatus comprising a control member movable between a first station and a second station, motion transmitting structure interconnecting said door and said control member and operable to move said control member from its first station to its second station in response to movement of said door from its closed position to its open position, spring means operatively connected to said seat and urging said seat to swivel from its driving position to its entry position, abutment means carried by said control member and said seat and limiting the advance of said seat in a direction toward its entry position to positions determined by the position of said control member as induced by opening movement of said door, and spring means urging said seat to its driving position in response to return of said control member to its first station when said door is closed.

3. In an automobile having wall and floor structure respectively supporting a door mounted for movement between closed and open positions and a seat supported for pivotal movement between a driving position and an entry position; apparatus operable to induce pivotal movement of said seat to its entry position in response to opening of said door and pivotal movement of said seat to its driving position in response to closing of said door, said apparatus comprising a member mounted for pivotal movement relative to the automobile floor structure between a first station in which it is located when the seat is in its driving position and a second station in which it is located when the seat is in its entry position, a cable interconnecting said door and said member and operable to move said member from its first station to its second station in response to movement of said door from its closed position to its open position, first spring means operatively connected to said seat and urging said seat to pivot from its driving position to its entry position, second spring means urging said member to its first station when said door is closed, and cooperating means carried by said member and said seat and operable to limit motion of said seat to prevent movement of said seat to its entry position unless said member is in its second station and operable to return said seat to its driving position when said second spring means returns said member to its first station.

4. In an automobile having wall and floor structure respectively supporting a door mounted for movement between closed and open positions and a seat supported for pivotal movement between a driving position and an entry position with latch means operable to lock said seat in its driving position; apparatus operable to induce pivotal movement of said seat to its entry position in response to opening of said door and pivotal movement of said seat to its driving position in response to closing of said door, said apparatus comprising a member mounted for movement relative to the automobile floor structure between a first station in which it is located when the seat is in its driving position and a second station in which it is located when the seat is in its entry position, motion transmtting structure interconnecting said door and said member and operable to disengage said latch means and move said member from its first station to its second station in response to movement of said door from its closed position to its open position, first spring means operatively connected to said seat and urging said seat to pivot from its driving position to its entry position, second spring means urging said member to its first station when said door is closed, and cooperating means carried by said member and said seat and operable to limit motion of said seat to prevent movement of said seat to its entry position unless said member is in its second station and operable to return said seat to its driving position when said second spring means returns said member to its first station.

5. In an automobile having wall and floor structure respectively supporting a door mounted for movement between closed and open positions and a seat supported for pivotal movement between a driving position and an entry position; apparatus operable to induce pivotal movement of said seat to its entry position in response to opening of said door and pivotal movement of said seat to its driving position in response to closing of said door, said apparatus comprising a member mounted for movement relative to the automobile floor structure between a first station in which it is located when the seat is in its driving position and a second station in which it is located when the seat is in its entry position, motion transmitting structure interconnecting said door and said member and operable to be tensioned and to move said member from its first station to its second station in response to movement of said door from its closed position to its open position, first spring means operatively connected to said seat and to said member and urging said seat to pivot from its driving position to its entry position, second spring means operatively connected to said floor structure and to said member and urging said member to its first station when said door is closed, and cooperating means carried by said member and said seat and operable to limit motion of said seat to prevent movement of said seat to its entry position unless said member is in its second station and operable to return said seat to its driving position when said second spring means returns said member to its first station.

6. In an automobile having wall and floor structure respectively supporting a door mounted for movement between closed and open positions and a seat supported for pivotal movement between a driving position and an entry position; apparatus operable to induce pivotal movement of said seat to its entry position in response to opening of said door and pivotal movement of said seat to its driving position in response to closing of said door, said apparatus comprising a member mounted for movement relative to the automobile floor structure between a first station in which it is located when the seat is in its driving position and a second station in which it is located when the seat is in its entry position, motion transmitting structure interconnecting said door and said member and operable to move said member from its first station to its second station in response to movement of said door from its closed position to its open position, first spring means operatively connected to said seat and urging said seat to pivot from its driving position to its entry position, second spring means urging said member to its first station when said door is closed, cooperating means carried by said member and said seat and operable to limit motion of said seat to prevent movement of said seat to its entry position unless said member is in its second station and operable to return said seat to its driving position when said second spring means returns said member to its first station, latch mechanism operable to latch said seat to the floor structure when the seat is in its driving position, a solenoid operable when activated to disengage said latch mechanism, and switch means operable by said motion transmitting structure and adapted to effect activation of said solenoid in response to opening of said door.

7. In an automobile having wall and floor structure respectively supporting a door mounted for movement between closed and open positions and a seat supported for pivotal movement between a driving position and an entry position, apparatus operable to induce pivotal movement of said seat to its entry position in response to opening of said door and pivotal movement of said seat to its driving position in response to closing of said door, said apparatus comprising a member mounted for movement relative to the automobile floor structure between a first station in which it is located when the seat is in its driving position and a second station in which it is located when the seat is in its entry position, motion transmitting structure interconnecting said door and said member and operable to move said member from its first station to its second station in response to movement of said door from its closed position to its open position, first spring means operatively connected to said seat and urging said seat to pivot from its driving position to its entry position, second spring means urging said member to its first station when said door is closed, cooperating means carried by said member and said seat and operable to limit motion of said seat to prevent movement of said seat to its entry position unless said member is in its second station and operable to return said seat to its driving position when said second spring means returns said member to its first station, latch mechanism operable to latch said seat to the floor structure when the seat is in its driving position, a solenoid operable when activated to disengage said latch mechanism, and switch means including first and second switches arranged in series with said solenoid, said first switch being operable by said motion transmitting structure and adapted to close in response to opening of said door, said second switch being normally closed and operable in response to the application of weight on said seat thereby to prevent unlatching of said seat when it is occupied.

8. In an automobile having wall and floor structure respectively supporting a door mounted for movement between closed and open positions and a seat supported for pivotal movement between a driving position and an entry position; apparatus operable to induce pivotal movement of said seat to its entry position in response to opening of said door and pivotal movement of said seat to its driving position in response to closing of said door, said apparatus comprising a member mounted for movement relative to the automobile floor structure between a first station in which it is located when the seat is in its driving position and a second station in which it is located when the seat is in its entry position, motion transmitting structure interconnecting said door and said member and operable to move said member from its first station to its second station in response to movement of said door from its closed position to its open position, first spring means operatively connecting said seat and said member and urging said seat to pivot from its driving position to its entry position, second spring means operatively connecting said member and said floor structure and urging said member to its first station when said door is closed, cooperating means carried by said member and said seat and operable to limit motion of said seat to prevent movement of said seat to its entry position unless said member is in its second station and operable to return said seat to its driving position when said second spring means returns said member to its first station and third spring means operatively connected to said door and operable to assist the opening of said door to thereby counteract any increased door opening effort imposed by the presence of said first and said second spring means.

References Cited in the file of this patent

UNITED STATES PATENTS

| | | |
|---|---|---|
| 2,242,247 | Grant | May 20, 1941 |
| 2,563,220 | Doty | Aug. 7, 1951 |
| 2,587,679 | Atkinson | Mar. 4, 1952 |
| 2,809,690 | Walther et al. | Oct. 15, 1957 |
| 2,822,858 | Mussler | Feb. 11, 1958 |